United States Patent
Huang et al.

(10) Patent No.: US 12,124,388 B2
(45) Date of Patent: Oct. 22, 2024

(54) BRIDGE CONTROL CHIP AND ASSOCIATED SIGNAL PROCESSING METHOD

(71) Applicant: Silicon Motion, Inc., Hsinchu County (TW)

(72) Inventors: Guo-Rung Huang, Taipei (TW); Chun-Chieh Chang, Taipei (TW); Hsing-Lang Huang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 29 days.

(21) Appl. No.: 18/109,269

(22) Filed: Feb. 14, 2023

(65) Prior Publication Data
US 2024/0119017 A1    Apr. 11, 2024

(30) Foreign Application Priority Data
Oct. 11, 2022    (TW) .................................. 111138475

(51) Int. Cl.
*G06F 13/00* (2006.01)
*G06F 13/16* (2006.01)
*G06F 13/18* (2006.01)
*G06F 13/40* (2006.01)

(52) U.S. Cl.
CPC .......... *G06F 13/18* (2013.01); *G06F 13/1621* (2013.01); *G06F 13/4027* (2013.01)

(58) Field of Classification Search
CPC ... G06F 13/18; G06F 13/1621; G06F 13/4027
See application file for complete search history.

(56) References Cited

U.S. PATENT DOCUMENTS

| | | | |
|---|---|---|---|
| 6,571,298 B1 | 5/2003 | Megiddo | |
| 2008/0120463 A1* | 5/2008 | Ashmore | G06F 3/0613 711/E12.001 |
| 2008/0282031 A1* | 11/2008 | Tanoue | G06F 3/0689 711/E12.001 |
| 2017/0139645 A1 | 5/2017 | Byun | |
| 2022/0121581 A1* | 4/2022 | Cho | G06F 13/1626 |

FOREIGN PATENT DOCUMENTS

| | | |
|---|---|---|
| CN | 1244046 C | 3/2006 |
| TW | I470436 B | 1/2015 |

* cited by examiner

*Primary Examiner* — Craig S Goldschmidt
(74) *Attorney, Agent, or Firm* — Winston Hsu

(57) ABSTRACT

A bridge control chip includes a first interface, a second interface, and a processor, wherein the first interface is coupled to a host device, the second interface is coupled to a memory device, and the memory device is a flash memory device. The processor is arranged to execute commands in a queue in sequence, to transmit the commands in the queue to the memory device through the second interface in sequence, wherein when the processor receives one or more received commands from the host device, the processor sorts the one or more received commands and commands which are currently and temporarily stored in the queue according to a distance between a logical address of each of the one or more received commands and a logical address of a current command in the queue that is currently executed by the processor.

15 Claims, 5 Drawing Sheets

BRIDGE CONTROL CHIP AND ASSOCIATED SIGNAL PROCESSING METHOD

BACKGROUND OF THE INVENTION

1. Field of the Invention

The present invention is related to a bridge control chip, and more particularly, to a bridge control chip that can improve the efficiency of a back-end electronic device that processes multiple read/write commands, and an associated signal processing method.

2. Description of the Prior Art

In a conventional universal serial bus (USB) attached SCSI protocol (UASP), a USB host is allowed to transmit multiple read/write commands for processing by a subsequent flash memory device. Since these multiple read/write commands from the USB host do not follow a certain rule with regards to a logical address, and the multiple read/write commands may include sequential read/write or random read/write, processing complexity of the flash memory device will be increased, thereby affecting performance of the flash memory device.

SUMMARY OF THE INVENTION

It is therefore one of the objectives of the present invention to provide a method for processing multiple read/write commands, which can improve the efficiency of a back-end electronic device that processes the multiple read/write commands, to address the above-mentioned issues.

According to an embodiment of the present invention, a bridge control chip is provided. The bridge control chip comprises a first interface, a second interface, and a processor, wherein the first interface is coupled to a host device, the second interface is coupled to a memory device, and the memory device is a flash memory device. The processor is arranged to execute commands in a queue in sequence, to transmit the commands in the queue to the memory device through the second interface in sequence, wherein when the processor receives one or more received commands from the host device, the processor sorts the one or more received commands and commands which are currently and temporarily stored in the queue according to a distance between a logical address of each of the one or more received commands and a logical address of a current command in the queue that is currently executed by the processor.

According to an embodiment of the present invention, a signal processing method for a bridge control chip is provided. The signal processing method comprises: receiving one or more received commands from a host device; and according to a distance between a logical address of each of the one or more received commands and a logical address of a current command in a queue that is currently executed by a processor, sorting the one or more received commands and commands which are currently and temporarily stored in the queue.

One of the benefits of the present invention is that, by sorting read/write commands received from the host device within the bridge control chip before the read/write commands are transmitted to the UFS device, the UFS device can process the read/write commands faster, which can improve the overall efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
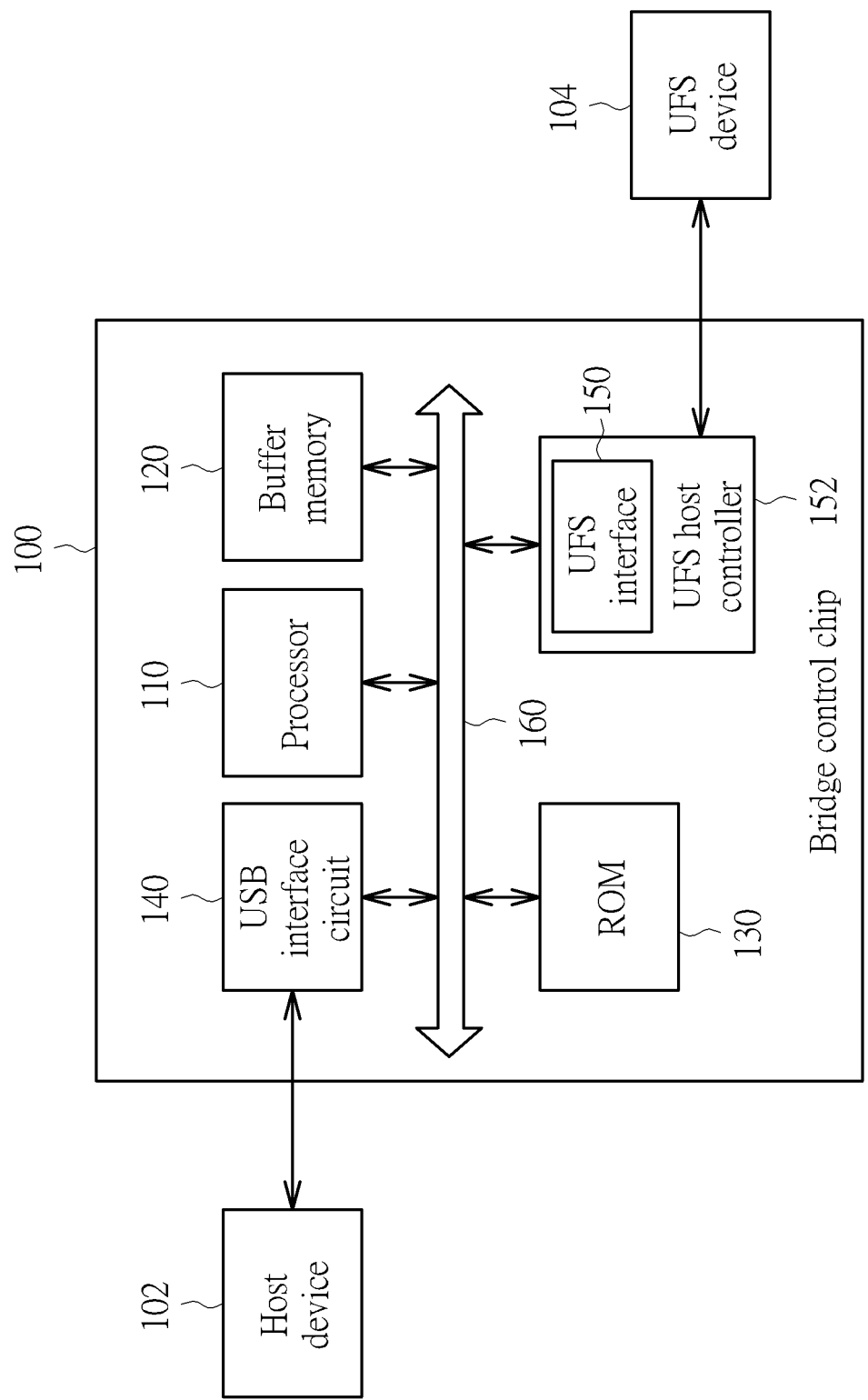
FIG. 1 is a diagram illustrating a bridge control chip according to an embodiment of the present invention.

FIG. 1 is a diagram illustrating a bridge control chip 100 according to an embodiment of the present invention, wherein in this embodiment, the bridge control chip 100 is a USB to universal flash storage (UFS) bridge control chip, allowing a host device 102 to be coupled to the bridge control chip 100 through a USB interface, and access a UFS device 104 through the bridge control chip 100. As shown in FIG. 1, the bridge control chip 100 includes a processor 110, a buffer memory 120, a read only memory (ROM) 130, a USB interface circuit 140, and a UFS interface 152, wherein the UFS interface 152 includes a UFS host controller 150; the USB interface circuit 140 is coupled to a host device 102; and the UFS interface 152 further includes an M-PHY circuit conforming to specifications related to the MIPI Alliance and unified protocol (UniPro) layer, and the UFS host controller 150 is coupled to the UFS device 104 through the M-PHY circuit. In addition, the buffer memory 120 can be implemented by a static random access memory (SRAM).

In this embodiment, the host device 102 can be an electronic device that has a USB interface and needs to access a UFS device (e.g. a laptop, a desktop computer, a mobile device, or a display device). The UFS device 104 can be a UFS memory card or a device comprising UFS storage components. The bridge control chip 100 can be a card reader externally connected to the host device 102 or a component embedded in the host device 102, and can be arranged to perform format-conversion upon commands from the host device 102 and transmit the converted commands to the UFS device 104, but the present invention is not limited thereto. In some embodiments, the bridge control chip 100 can also be arranged to convert signals with other specifications, the UBS interface circuit 140 can be replaced by an interface circuit conforming to a first specification, and the UFS interface 152 can be replaced by an interface circuit conforming to a second specification. For example, the bridge control chip 100 can perform signal conversion between the USB specification and a secure digital (SD) specification, and the UFS device 104 can be replaced by an SD card.

In the bridge control chip 100, the processor 110 can read program code in the ROM 130, and control operations of internal components through a bus 160 (e.g. transmit to and receive data from the host device 102 through the USB interface circuit 140, perform required buffer processing through the buffer memory 120, and transmit to and receive data from the UFS device 104 through the UFS host controller 150).

In this embodiment, the host device 102 supporting UASP can transmit multiple read/write commands to the bridge control chip 100 for accessing the UFS device 104. Since the multiple read/write commands from the host device 102 do not follow a certain rule with regards to a logical address, processing complexity of the UDS device 104 for the multiple read/write commands will be increased, which degrades the access performance. In order to address this issue, the bridge control chip 100 sorts the multiple read/write commands from the host device 102 and then transmits them to the UFS device 104, to improve efficiency of the UFS device 104 that executes these read/write commands.

Figure 2:
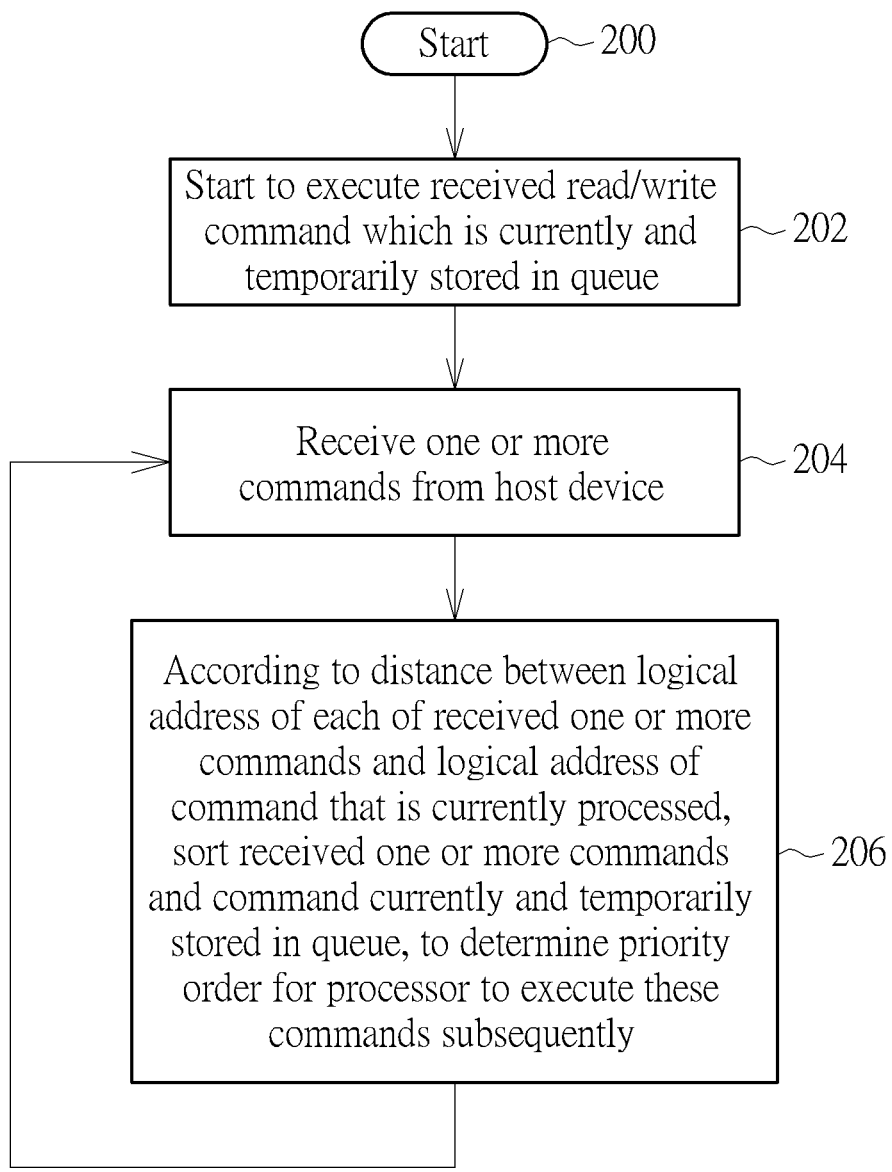
FIG. 2 is a flow chart of a signal processing method according to a first embodiment of the present invention.

FIG. 2 is a flow chart of a signal processing method according to a first embodiment of the present invention.

In Step 200, the flow starts, the bridge control chip 100 is connected to the host device 102 and the UFS device 104, and completes associated initialization operations.

In Step 202, the processor 110 starts to execute a received read/write command which is currently and temporarily stored in a queue inside the bridge control chip 100, wherein the queue can be within the buffer memory 120, but the present invention is not limited thereto.

In Step 204, the bridge control chip 100 receives one or more read/write commands from the host device 102.

In Step 206, the processor 110 sorts one or more received read/write commands and commands which are currently and temporarily stored in the queue according to a distance between a logical address of each of the one or more received read/write commands and a logical address of a read/write command that is currently being processed, to determine a priority order for the processor 110 to execute these read/write commands subsequently. Afterwards, the flow returns to Step 204.

Figure 3:
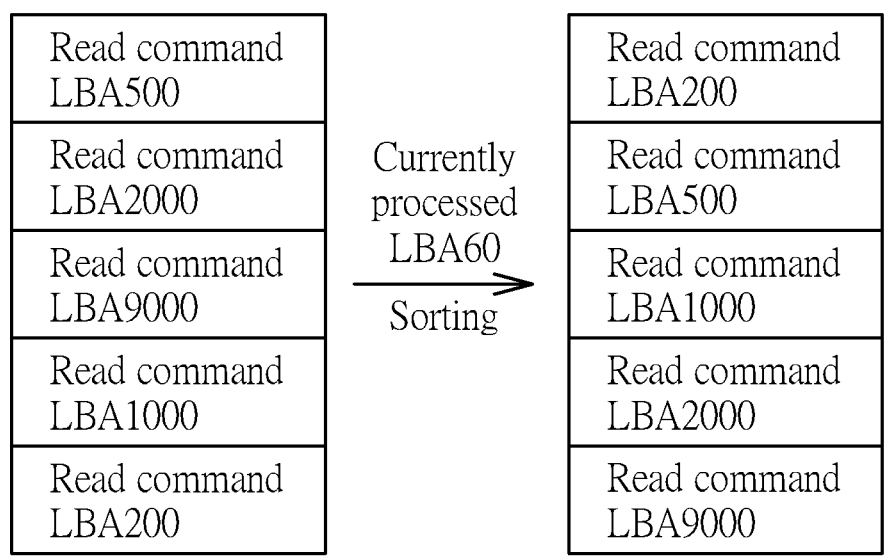
FIG. 3 is a diagram illustrating sorting of read/write commands according to an embodiment of the present invention.

Take FIG. 3 as an example. FIG. 3 is a diagram illustrating sorting of read/write commands according to an embodiment of the present invention. It is assumed that the processor 110 is currently processing a read command with a logical address LBA60 (i.e. the read command with the logical address LBA60 is currently transmitted to the UFS device 104 through the UDS host controller 150 and direct memory access (DMA)), and there are no other read commands in the queue at this time. As shown in FIG. 3, it is assumed that the host device 102 sequentially transmits read commands with logical addresses LBA500, LBA2000, LBA9000, LBA1000, and LBA200 to the bridge control chip 100. Since distances between logical addresses of these read commands and the logical address LBA60 from small to large are LBA200, LBA500, LBA1000, LBA2000, and LBA9000, the processor 110 will sort these read commands in the queue from small to large according to the distances. That is, after the processor 110 finishes processing the read command with the logical address LBA60, the processor 110 will sequentially transmit the read commands with the logical addresses LBA200, LBA500, LBA1000, LBA2000, and LBA9000 to the UFS device 104.

In another embodiment, it is assumed that the processor 110 is currently processing the read command with the logical address LBA60, and there is still a read command with a logical address LBA700 in the queue. After the bridge control chip 100 sequentially receives the read commands with the logical addresses LBA500, LBA2000, LBA9000, LBA1000, and LBA200, the processor 110 will sort the read command in the queue and the read commands received from the host device 102, to make the queue sequentially be the read commands with the logical addresses LBA200, LBA500, LBA700, LBA1000, LBA2000, and LBA9000. That is, after the processor 110 finishes processing the read command with the logical address LBA60, the processor 110 will sequentially transmit the read commands with the logical addresses LBA200, LBA500, LBA700, LBA1000, LBA2000, and LBA9000 to the UFS device 104.

Figure 4:
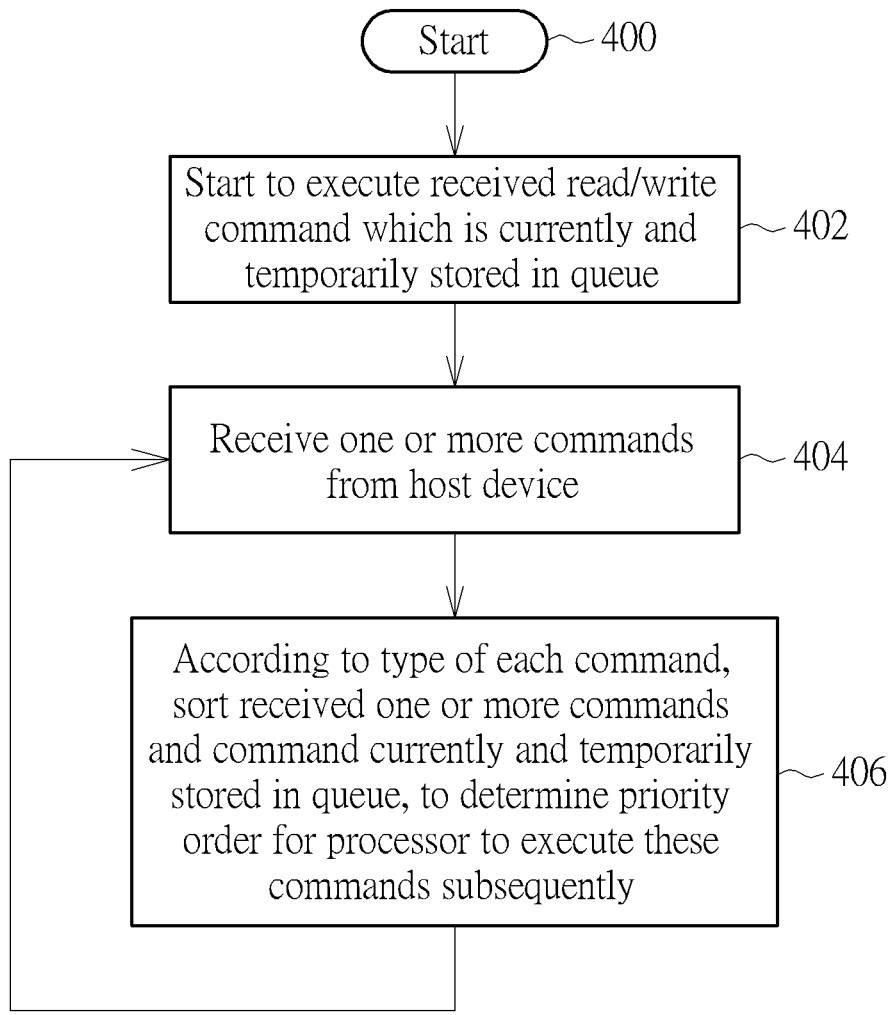
FIG. 4 is a flow chart of a signal processing method according to a second embodiment of the present invention.

FIG. 4 is a flow chart of a signal processing method according to a second embodiment of the present invention.

In Step 400, the flow starts, the bridge control chip 100 is connected to the host device 102 and the UFS device 104, and completes associated initialization operations.

In Step 402, the processor 110 starts to execute a received read/write command which is currently and temporarily stored in a queue inside the bridge control chip 100.

In Step 404, the bridge control chip 100 receives one or more commands from the host device 102.

In Step 406, the processor 110 sorts the received one or more commands and the read/write command currently and temporarily stored in the queue according to a type of each command (e.g. a read command or a write command), to determine a priority order for the processor 110 to execute these read/write commands subsequently. Afterwards, the flow returns to Step 404.

It is assumed that the processor 110 is currently processing a write command with a logical address LBA220 (i.e. the processor 110 transmits the write command with the logical address 220 to the UFS device 104 through the UFS host controller 150 and DMA), and there are no other commands in the queue at this time. If the host device 102 sequentially transmits a read command with a logical address LBA300, a read command with a logical address LBA400, and a write command with a logical address LBA320 to the bridge control chip 100, the processor 110 will sort commands with a same type as the write command that is currently processing according to a priority order. That is, after the processor 110 finishes processing the write command with the logical address LBA220, the processor 110 will sequentially transmit the write command with the logical address LBA320, the read command with the logical address LBA300, and the read command with the logical address LBA400 to the UFS device 104.

In one embodiment, when the processor 110 is currently processing a write command, no matter whether the bridge control chip 100 receives other read commands first or logical addresses of these read commands are closer to the logical address of the write command currently processed by the processor 110, the processor 110 will sort write commands in subsequent commands according to a priority order. Additionally, in addition to sorting the write commands in the subsequent commands according to a priority order, the processor 110 will further sort received write commands and the write command currently and temporarily stored in the queue according to a distance between a logical address of each of the received write commands and a logical address of the write command that is currently processed (as described in the embodiment of FIG. 2), to determine a priority order for subsequently executing these write commands by the processor 110.

Similarly, when the processor 110 is currently processing a read command, no matter whether the bridge control chip 100 receives other write commands first or logical addresses of these write commands are closer to the logical address of the read command currently processed by the processor 110, the processor 110 will sort read commands in subsequent commands according to a priority order. Additionally, in addition to sorting the read commands in the subsequent commands according to a priority order, the processor 110 will further sort received read commands and the read command currently and temporarily stored in the queue according to a distance between a logical address of each of the received read commands and a logical address of the read command that is currently processed (as described in the embodiment of FIG. 2), to determine a priority order for subsequently executing these read commands by the processor 110.

Figure 5:
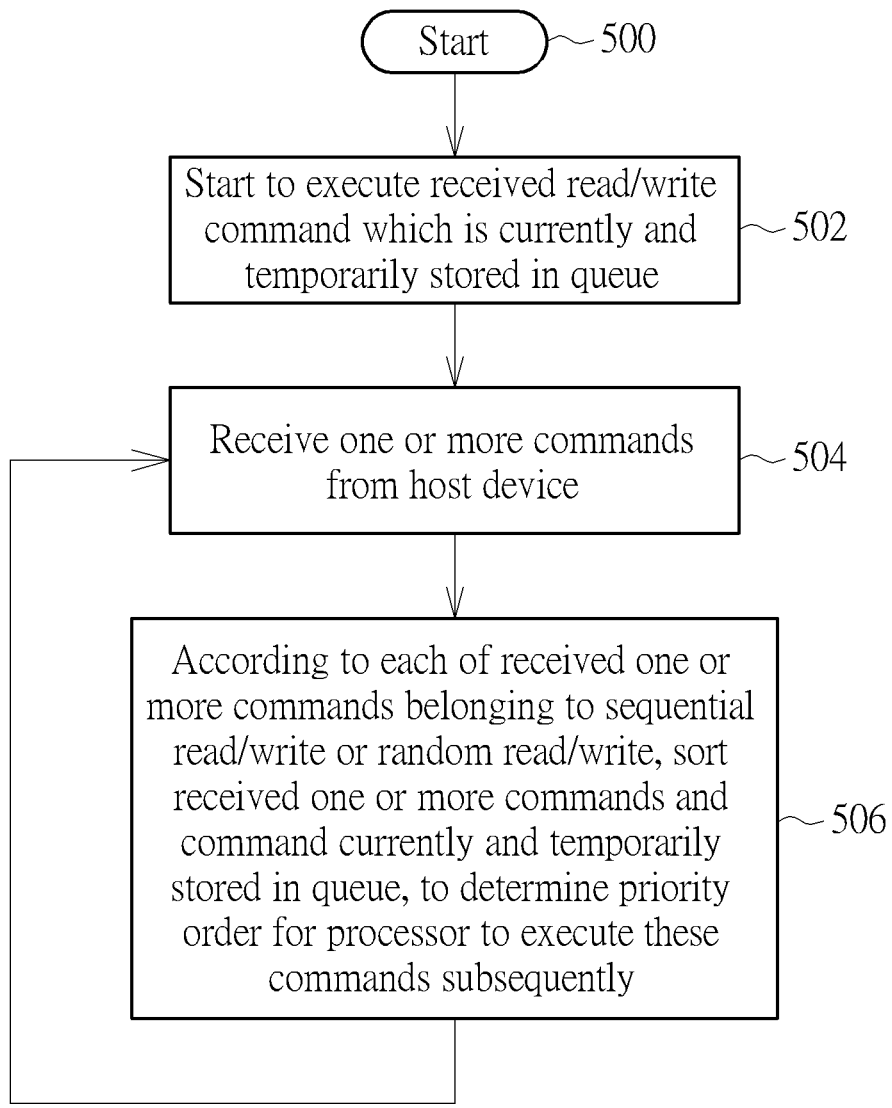
FIG. 5 is a flow chart of a signal processing method according to a third embodiment of the present invention.

FIG. 5 is a diagram illustrating a signal processing method according to a third embodiment of the present invention.

In Step 500, the flow starts, the bridge control chip 100 is connected to the host device 102 and the UFS device 104, and completes associated initialization operations.

In Step 502, the processor 110 starts to execute a received read/write command which is currently and temporarily stored in a queue inside the bridge control chip 100.

In Step 504, the bridge control chip 100 receives one or more commands from the host device 102.

In Step 506, the processor 110 sorts received one or more commands and the read/write command currently and temporarily stored in the queue according to each of the received one or more commands belonging to sequential read/write or random read/write, to determine a priority order for subsequently executing these read/write commands by the processor 110. In this embodiment, the random read/write represents that the command only requests read data with a logical address, such as data with 4 KB, and the sequential read/write represents that the command requests read multiple data with continuous logical addresses, such as data with 512 KB corresponding to logical addresses LBA0-LBA127. Afterwards, the flow returns to Step 504.

In one embodiment, when the bridge control chip 100 receives a read/write command belonging to the sequential read/write, the processor 110 will process this read/write command as priority even if there are other read/write commands belonging to the random read/write currently in the queue. For example, it is assumed that the processor 110 is currently processing a read command with a logical address LBA220 (i.e. the processor 110 transmits the read command with the logical address LBA220 to the UFS device 104 through the UFS host controller 150 and DMA), and there are no other commands in the queue. If the host device 102 sequentially transmits a read command with a logical address LBA300 and read commands with logical addresses LBA0-LBA127 to the bridge control chip 100, the processor 110 will sort the read commands with the logical addresses LBA0-LBA127 according to a priority order. That is, after the processor 110 finishes processing the read command with the logical address LBA220, the processor 110 will sequentially transmit the read commands with the logical addresses LBA0-LBA127 and the read command with the logical address LBA300 to the UFS device 104.

In another embodiment, the embodiments of FIG. 2, FIG. 4, and FIG. 5 can be combined to sort the commands received by the bridge control chip 100. That is, the processor 110 will sort received commands and the command currently and temporarily stored in the queue according to a type of each command, whether each command belongs to the sequential read/write or the random read/write, and/or the distance between the logical address of each of the received commands and the logical address of the command currently processed. For example, when sorting the commands, the processor 110 can process the commands with the same type as the command currently processed as priority. If the processor 110 is currently processing a write command, the processor 110 can process write commands in subsequent commands as priority, process commands belonging to the sequential read/write as second priority, and then sort the commands in the queue according to the distance between the logical address of each of the read/write commands and the logical address of the write command currently processed. In other words, sorting the received commands and the commands currently and temporarily stored in the queue according to the type of each command has the highest priority; sorting the received commands and the commands currently and temporarily stored in the queue according to each command belonging to the sequential read/write or the random read/write has the second highest priority; and sorting the received commands and the commands currently and temporarily stored in the queue according to the distance between the logical address of each of the received commands and the logical address of the command currently and temporarily stored in the queue has the lowest priority.

In summary, by sorting read/write commands received from the host device 102 within the bridge control chip 100 before the read/write commands are transmitted to the UFS device 104, the UFS device 104 can process the read/write commands faster, which can improve the overall efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bridge control chip, comprising:
   a first interface, coupled to a host device;
   a second interface, coupled to a memory device, wherein the memory device is a flash memory device; and
   a processor, arranged to execute commands in a queue in sequence, to transmit the commands in the queue to the memory device through the second interface in sequence;
   wherein when the processor receives one or more received commands from the host device, the processor sorts the one or more received commands and commands which are currently and temporarily stored in the queue according to a distance between a logical address of each of the one or more received commands and a logical address of a current command that is currently executed by the processor, and a distance between a logical address of each of the commands which are currently and temporarily stored in the queue and the logical address of the current command; wherein the current command is different from any one of the commands which are currently and temporarily stored in the queue, and the current command is currently transmitted to the memory device through the second interface by the processor.

2. The bridge control chip of claim 1, wherein the first interface is a universal serial bus (USB) interface circuit, and the second interface is a universal flash storage (UFS) interface including a UFS host controller.

3. The bridge control chip of claim 1, wherein according to the distance between the logical address of said each of the one or more received commands and the logical address of the current command, the processor sorts the commands currently and temporarily stored in the queue from small to large, to execute a command with a logical address with a smaller distance from the current command at high priority.

4. The bridge control chip of claim 1, wherein according to a type of each command, the processor further sorts the one or more received commands and the commands currently and temporarily stored in the queue.

5. The bridge control chip of claim 4, wherein in response to the current command being a write command, the processor sorts write commands in the one or more received commands before read commands in the queue; and in response to the current command being a read command, the processor sorts read commands in the one or more received commands before write commands in the queue.

6. The bridge control chip of claim 4, wherein a priority of sorting the one or more received commands and the commands currently and temporarily stored in the queue according to the type of said each command is higher than a priority of sorting the one or more received commands and the commands currently and temporarily stored in the queue according to the distance between the logical address of said each of the one or more received commands and the logical address of the current command.

7. The bridge control chip of claim 4, wherein according to said each command belonging to sequential read/write or random read/write, the processor further sorts the one or more received commands and the commands currently and temporarily stored in the queue.

8. The bridge control chip of claim 7, wherein the processor sorts commands belonging to the sequential read/write before commands belonging to the random read/write.

9. The bridge control chip of claim 7, wherein sorting the one or more received commands and the commands currently and temporarily stored in the queue according to the type of said each command has the highest priority; sorting the one or more received commands and the commands currently and temporarily stored in the queue according to said each command belonging to the sequential read/write or the random read/write has the second highest priority; and sorting the one or more received commands and the commands currently and temporarily stored in the queue according to the distance between the logical address of said each of the one or more received commands and the logical address of the current command has the lowest priority.

10. A signal processing method for a bridge control chip, comprising:
  receiving one or more received commands from a host device; and
  sorting the one or more received commands and commands which are currently and temporarily stored in a queue according to a distance between a logical address of each of the one or more received commands and a logical address of a current command that is currently executed by a processor, and a distance between a logical address of each of the commands which are currently and temporarily stored in the queue and the logical address of the current command; wherein the current command is different from any one of the commands which are currently and temporarily stored in the queue, and the current command is currently transmitted to a memory device by the processor.

11. The signal processing method of claim 10, wherein the step of according to the distance between the logical address of said each of the one or more received commands and the logical address of the current command, sorting the one or more received commands and the commands currently and temporarily stored in the queue comprises:
  according to the distance between the logical address of said each of the one or more received commands and the logical address of the current command, sorting the commands currently and temporarily stored in the queue from small to large, to execute a command with a logical address with a smaller distance from the current command at high priority.

12. The signal processing method of claim 10, further comprising:
  according to a type of each command, sorting the one or more received commands and the commands currently and temporarily stored in the queue.

13. The signal processing method of claim 12, wherein the step of according to the type of said each command, sorting the one or more received commands and the commands currently and temporarily stored in the queue comprises:
  in response to the current command being a write command, sorting write commands in the one or more received commands before read commands in the queue; and
  in response to the current command being a read command, sorting read commands in the one or more received commands before write commands in the queue.

14. The signal processing method of claim 12, further comprising:
  according to said each command belonging to sequential read/write or random read/write, sorting the one or more received commands and the commands currently and temporarily stored in the queue.

15. The signal processing method of claim 14, wherein the step of according to said each command belonging to the sequential read/write or the random read/write, sorting the one or more received commands and the commands currently and temporarily stored in the queue comprises:
  sorting commands belonging to the sequential read/write before commands belonging to the random read/write.

* * * * *